Nov. 30, 1926.

G. W. HEATH

ELECTRIC CONDENSER PLATE

Filed April 15, 1924

1,608,504

INVENTOR
George W. Heath
BY
Warren S. Orton
ATTORNEY

Patented Nov. 30, 1926.

1,608,504

UNITED STATES PATENT OFFICE.

GEORGE W. HEATH, OF NEWARK, NEW JERSEY.

ELECTRIC CONDENSER PLATE.

Application filed April 15, 1924. Serial No. 706,625.

The invention relates to a metallic plate for use either as the stator or rotor plate of electric condensers of the type used in high oscillating circuits, such as radio apparatus. It has been the usual practice in forming these plates to make them with smooth surfaces to minimize surface leakage from the intervening dielectric and it has been usual to feature the providing of maximum capacity by positioning the plates as close together as is mechanically possible, and yet insure the presence of a dielectric of uniform thickness therebetween. It has also been usual to compress the plates slightly and largely for the purpose of rendering them flat or uniplanar.

The primary object of the present invention is to provide an improved form of condenser in so far as the plate structure is concerned. The present disclosure features a plate, which conforms somewhat to conventional design and is characterized therefrom, first, by an extremely thin plate reinforced to defeat warping tendencies and with the condenser face stippled to increase condenser surface over a similar sized smooth faced plate.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 1:
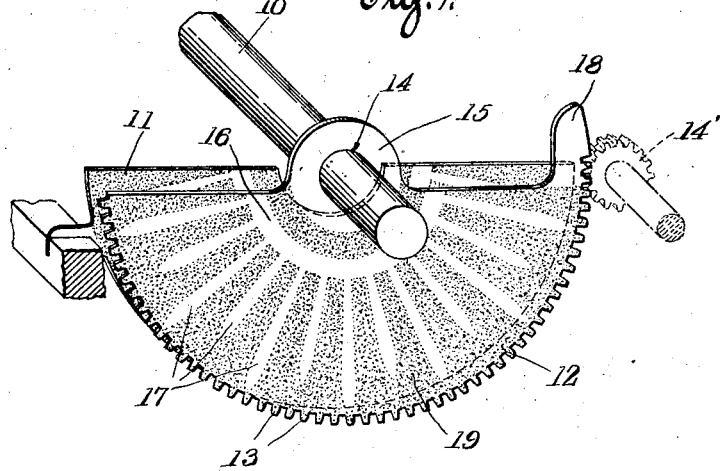
Figure 2:
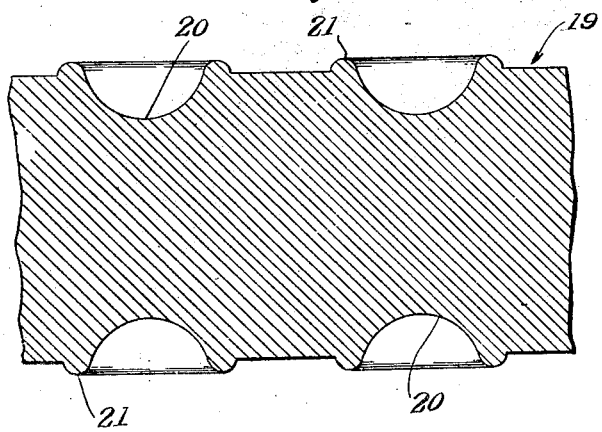

Figure 1 is a fragmentary view of a condenser plate assembly with the rotor plate thereof illustrating a preferred embodiment of the invention; and Figure 2 is a transverse sectional view taken through a stippled portion of the plate shown in Figure 1, and greatly magnified to show a portion of the stippled surface in exaggerated form.

In the following description and in the claims, parts will be identified by specific names for convenience of expression but they are intended to be as generic in their application to similar parts as the art will permit.

In the drawing there is shown a supporting shaft 10 concentrically disposed relative to which are mounted two condenser plates comprising a stator plate 11 and a rotor 12 with the rotor plate secured to the shaft. The rotor plate is provided with marginal teeth 13 and is designed to be actuated from a manually controlled pinion 14 and in other respects the construction as thus far disclosed is more fully described in my copending application on variable condensers, Serial No. 593,725, filed October 11, 1922.

In forming the plate 12 the usual sheet metal is employed and blanks are cut to shape, following conventional practice. The blanks are then subjected to the action of a powerful stamping machine, which compresses slightly certain portions of the plates while leaving other portions either uncompressed or relatively slightly compressed. The uncompressed portion includes a ring about the aperture 14 which contains the shaft 10 and as this uncompressed portion projects slightly from the adjacent compressed portion of the plate it will be referred to hereinafter as a sleeve 15 which constitutes a bearing for the plate on the shaft. It is understood that the identification of this as a sleeve is something of an exaggeration for the so-called sleeve is of no greater thickness than the conventional plate now in general use. In order to further reinforce the plate concentrically of the axis of the aperture containing the shaft a second substantially semi-circular rib 16 is formed on opposite sides of the plate and spaced a short distance from the sleeve. Extending radially from the rib 16 is a plurality of radially extending spoke like projections or ribs 17. Neither the curved portion of the periphery nor the extension 18 are compressed so that these parts coact with the ribs and sleeve at the center to form slight projections from the main compressed body of the plate. As these projections are integral with the plate they act as outstanding reinforcements but it is understood that the amount of projection has been minimized as far as possible so as to introduce the least possible increase in air gap space between adjacent plates. These reinforcements tend to defeat warping of the plates so that with the construction disclosed it is possible to bring the plates closer together than is deemed advisable with the present form of unreinforced plates.

For the purpose of increasing the condenser surface of one plate which is exposed to its correlated plate the compressed portion 19 of the plate and between the uncompressed reinforcement-forming part is stippled. This stippling is formed by subjecting the plate to the action of a die provided with a plurality of closely positioned and relatively small punching projections. Examination with the naked eye, shows the stipple to be simply a series of fine pin-point dots, but examination under the microscope shows the surface to have the appearance of a plurality of semi-spherical depressions or concavities 20. Due presumably to the enormous pressure used in compressing the plate and in forming the stipple surface, the material of the plate is apparently shifted and there is formed about each of the concavities 20 a slightly raised rim 21, which encircles the depression and forms across the face of the plate a series of ring-like projections somewhat irregular in form. As the depressions and elevations are relatively small in diameter compared to the thickness of the plate the showing in Figure 2 has been designed so as to show a relatively shallow depression and elevation compared to the thickness of the plate and with the centers of the depressions spaced apart a material distance.

By means of the stippled or roughened face it has been possible apparently to increase the extent of condenser surface within the confines of a relatively small plate.

Having thus described my invention, I claim:

1. In a variable electric condenser, a flat, rotor plate substantially semi-circular and provided with an extension projecting from the peripheral part of the plate, said periphery and extension provided with means constituting part of a driving connection for turning the plate, said plate provided with stippled portions and with unstippled portions, the stippling formed of minute concavities in the face of the plate, said unstippled portions including the driving extension projecting slightly beyond the stippled portions and constituting reinforcements.

2. In a variable electric condenser, a flat, rotor plate substantially semi-circular and provided with marginal teeth, said plate provided on one face with stippled portions and with unstippled portions, said stippled portions forming in effect slight alternate depressions and elevations of said unstippled portions including the teeth and constituting reinforcements for the plate.

3. In an electric condenser, the combination of stator and rotor plates operatively associated, the surface of one of said plates provided with indentations to increase the surface exposed to the associated plate and certain parts of said indented plate being free of the indentations thereby to provide requisite structural strength to the plate.

4. A flat sheet metal condenser plate with portions on opposite sides slightly compressed and stippled and with intermediate portions uncompressed, the uncompressed portions being oppositely disposed and coacting to provide ribs integral with and projecting from opposite sides of the plate.

5. In a variable condenser, the combination of stator plates and rotor plates adapted to be mutually interleaved, said plates being parallel to each other and one of said plates having its surface roughened to increase the condenser surface exposed to its associated plate.

6. In an electric condenser, the combination of stator and rotor plates operatively associated, the surface of one of said plates provided with indentations to increase the surface exposed to the associated plate.

7. In a variable condenser, a condenser plate substantially semi-circular and having portions compressed to reduce slightly the thickness of the compressed portions, the uncompressed portions providing integral reinforcing ribs and including a semi-circular rib concentrically disposed on one side of the plate and long radial ribs extending spoke-like from the semi-circular rib.

8. In a variable condenser, the combination of a supporting shaft, a plate provided with an aperture containing said shaft, certain portions of the plate in spaced relation to the aperture being compressed and a circular portion surrounding the aperture being uncompressed thereby to form in effect a collar surrounding the aperture and journalled on the shaft, said collar having a thickness slightly greater than the compressed portion of the plate.

Signed at New York in the county of New York and State of New York this 3rd day of April A. D. 1924.

GEORGE W. HEATH.